United States Patent [19]

Teramachi

[11] Patent Number: 4,749,284

[45] Date of Patent: Jun. 7, 1988

[54] LINEAR SLIDING BALL BEARING

[76] Inventor: Hiroshi Teramachi, 34-8, Higashitamagawa 2-chome, Setagaya-ku, Tokyo, Japan

[21] Appl. No.: 864,359

[22] Filed: May 19, 1986

[30] Foreign Application Priority Data

May 28, 1985 [JP] Japan ................. 60-113234
May 28, 1985 [JP] Japan ................. 60-113235

[51] Int. Cl.⁴ .......................................... F16C 29/06
[52] U.S. Cl. ...................................................... 384/45
[58] Field of Search ............... 384/43, 44, 45, 51, 384/49, 55, 18, 19, 25

[56] References Cited

U.S. PATENT DOCUMENTS

| | | | |
|---|---|---|---|
| 4,253,709 | 3/1981 | Teramachi | 308/6 |
| 4,296,974 | 10/1981 | Teramachi | 308/6 |
| 4,376,557 | 3/1983 | Teramachi | 308/6 |
| 4,428,627 | 1/1984 | Teramachi | 308/6 |
| 4,531,788 | 7/1985 | Teramachi | 308/6 |
| 4,541,674 | 9/1985 | Mitschang | 384/45 |
| 4,549,772 | 10/1985 | Teramachi | 308/6 |
| 4,555,149 | 11/1985 | Teramachi | 308/6 |

FOREIGN PATENT DOCUMENTS

| | | |
|---|---|---|
| 569560 | 4/1924 | France . |
| 2442373 | 6/1980 | France . |
| 59-13118 | 1/1984 | Japan . |
| 226713 | 12/1984 | Japan . |
| 60-88219 | 5/1985 | Japan . |
| 1433529 | 4/1976 | United Kingdom . |
| 1550905 | 8/1979 | United Kingdom . |
| 2026103A | 1/1980 | United Kingdom . |
| 1569553 | 6/1980 | United Kingdom . |

Primary Examiner—David Werner
Attorney, Agent, or Firm—Armstrong, Nikaido, Marmelstein & Kubovcik

[57] ABSTRACT

Disclosed is a linear sliding ball bearing wherein a ball-feeding portion whose width becomes gradually smaller and is adapted to feed balls from a loaded region to the unloaded region of an endless track formed on the side of a bearing body, or from this unloaded region to the loaded region, is formed at both ends of an elongated hole in the longitudinal direction thereof which is formed in a ball retainer. The circulation of the balls circulating between the loaded and unloaded regions is effected smoothly by virtue of this ball-feeding portion, thereby reducing noise.

2 Claims, 6 Drawing Sheets

LINEAR SLIDING BALL BEARING

FIELD OF THE INVENTION AND RELATED ART STATEMENT

The present invention relates to a linear sliding ball bearing, and more particularly to an improvement of a linear sliding ball bearing frequently employed in the X-, Y- and Z-axes in machine tools such as NC machines and in sliding portions of various types of general industrial machines, including automatic tool-replacing apparatuses, automatic welding machines, injection molding machines, and industrial robots.

Heretofore, as this type of linear sliding ball bearing, there is known one which is constituted by a guide shaft having a groove for a ball-rolling groove along the axial direction, a bearing body having an unloaded ball hole and a loaded ball groove for forming an endless track for the balls rolling along the rolling groove, a pair of side covers installed on both longitudinal end surfaces of this bearing body and having a guide groove for guiding the balls between the loaded ball groove and the unloaded ball hole, and a ball retainer for preventing the coming off of the balls when the bearing body is separated from the guide shaft and for forming a part of the endless track of the balls formed in the bearing body.

In such a linear sliding ball bearing, there has been a strong demand for each of the balls to smoothly circulate along the endless track for the balls so as to prevent change in sliding resistance and the occurrence of noise at the time when this bearing is incorporated in a sliding portion of a general industrial machine and is made to slide therein.

In this type of linear sliding bearing, as one example of the above-mentioned ball retainer, one has been used which is obtained by bending a metal plate into an appropriate shape so as to form a tongue and is incorporated into a bearing body. In this toungue, an elongated hole is provided in a position facing a loaded ball groove formed in the bearing body, and parts of balls located in the unloaded region of an endless track is made to project from this elongated hole toward the side of a guide shaft. This tongue is used to supply the balls from the unloaded region to the loaded region of the endless track, or to scoop up the balls from the loaded region to the unloaded region. In addition, a ball retainer made of a synthetic resin has also been proposed.

However, in the case of the former metallic ball retainer, although it has been satisfactory in that it has excellent rigidity and durability, it has had a problem in that, at the time when a ball is scooped up from the loaded region to the unloaded region, a ball collides against the tongue of the ball retainer, thereby giving rise to unpleasant metallic noise, which has constituted a large noise especially during high-speed motion. In addition, in the case of the latter synthetic resin-made ball retainer, the generation of such noise is less pronounced, but there has been a problem in that its ridigity is inferior to that of a metallic one, so that it has been prone to be subjected to deformation, and there has also been a problem in terms of durability.

Furthermore, in such a linear sliding ball bearing, as a means of accurately positioning each of the unloaded ball holes on the bearing body side and each of the guide grooves on the side cover side at the time of installing each side cover on the both end surfaces of the bearing body, a means such as providing a bush or the like on the outside of a coupling bolt for coupling the two has been adopted.

However, it is extremely difficult to form without errors unloaded ball holes and guide grooves in each side cover respectively installed on both end surfaces. In addition, the side covers are in many cases fabricated by die forming or molding by the use of a metal or a hard synthetic resin, and, in such a case, there occurs the problem of thermal shrinkgage, so that it is practically impossible to finish them to strict precision. Consequently, it is difficult to accurately align each of the unloaded ball holes on the bearing body side and each of the guide grooves on the side cover side, which has sometimes resulted in giving rise to a disturbance in the rolling of each ball circulating inside the endless track for the balls. Furthermore, in a case where the positioning is carried out using bushes, the number of parts employed disadvantageously increases by that margin and results in increased cost. Moreover, misalignment between the two has sometimes occurred.

To overcome the afornentioned drawbacks, the applicant proposed earlier a linear sliding ball bearing which has the following arrangement. In a bearing body, a fitting portion expanding outwardly is formed in the edge portion of the opening of each unloaded ball hole, while a peripheral protrusion protruding outwardly from the periphery of each guide groove corresponding to the afornentioned fitting portion is formed in the inner side of each side cover. The restriction of the position of each side cover is effected by fitting these peripheral protrusions into the aforementioned fitting portions, and each of these side covers is secured to the both end surfaces of the bearing body, thereby forcibly positioning the unloaded ball holes on the bearing body side and the guide grooves of the side cover side. Thus, each of the balls is made to smoothly circulate inside the endless track for the balls thus constructed. (Refer to Japanese Patent Laid-Open No. 226713/1984.)

However, even in this linear sliding ball bearing, the problems concerning the aforementioned retainer cannot be solved. With respect to the alignment of the bearing body and the side covers, it is possible to ensure a certain degree of accuracy, and yet, with respect to the fitting portions formed on the bearing body side, it is necessary to form a portion for joining the peripheral protrusion formed in the side cover as well as a portion for constituting a portion of the unloaded region of the endless track together with the guide groove of this side cover side. Thus it becomes necesary to work these portions in different configurations, thereby disadvantageously making the working processes complicated since at least two kinds of work are required in the working of this fitting portion. Hence, there has been demand for making a further improvement on the ball circulating mechanism in such a linear sliding ball bearing.

OBJECT AND SUMMARY OF THE INVENTION

Accordingly, an object of the present invention is to provide a linear sliding ball bearing having an endless track which permits each ball disposed inside the endless track for the balls to smoothly circulate so as to prevent any change in the sliding resistance and the generation of noise.

Another object of the present invention is to provide a linear sliding ball bearing which makes use of the characteristics inherent in a metallic ball retainer and has the following arrangement. As a mecchanism for feeding the balls from a loaded region to an unloaded region in the endless track for the balls, or from the unloaded region to the loaded region, a ball-feeding portion whose width becomes gradually smaller is formed at the both ends of an elongated hole in the longitudinal direction thereof, and a ball-abutting surface having a slanting surface opposing a continuous slanting surface in the guide groove of the side cover is formed at least in this ball-feeding portion, whereby the balls moving from the loaded region to the unloaded region are fed into the guide groove while being gradually lifted from the loaded ball groove, and the balls moving from the unloaded region to the loaded region are fed gradually into the loaded ball groove. At the same time, in order to support the balls, at this juncture, by means of a ball-abutting surfaces having a continuous slanting surface portion in the guide groove of the side cover as well as slanting surface portions opposed to each other, the linear sliding ball bearing is adapted to be capable of preventing the generation of metallic noise between the balls and the ball retainer and of effecting even more smoothly the circulation of the balls from the loaded region to the unloaded region of the endless track, or from from the unloaded region to the loaded region thereof.

A further object of the present invention is to provide a linear sliding ball bearing which is arranged as follows A chamfered U-shaped portion having the same curvature as that of the inner surface-side guide and formed at both ends of the loaded ball groove to shift the direction of the balls is formed at both ends of the unloaded ball hole of the bearing body. A side cover-positioning peripheral protrusion which fits into the chamfered U-shaped portion is formd at the peripheral edge of the guide groove in each of the side covers which corresponds to each of the chamfered U-shaped portions. This enables the working the chamfered U-shaped portion at both ends of the unloaded ball hole to be effected simultaneously as the working of the inner surface-side guide of the loaded ball groove, and to effect the working of this chamfered U-shaped portion with high accuracy and ease. Thus, this arrangement makes it possible to combine the bearing body and the side covers with high accuracy and positively, and to effect even more smoothly the movement of the balls from the loaded region to the unloaded region, or vice versa.

In the present invention, ball feeding portions each provided at both end portions of the elongated hole of the ball retainer are formed such that its width becomes gradually smaller in the direction toward the end and are sufficient if they are capable of feeding the balls from the loaded region side to the unloaded region side of the endless track or vice versa when the balls have moved along the elongaged hole. The shape of the ball feeding portions may be either semielliptical or V-shaped. In addition, a ball-abutting surface formed in the ball feeding portion of the elongated hole is sufficient if it has a slanting surface portion opposing a continuous slanting surface continuing along the guide groove of the side cover and if it is capable of feeding the balls from the loaded ball groove to the guide groove of the side cover or vice versa while receiving the balls by these slanting surface portions. The ball-abutting surface may be a slanting planar surface or a slanting surface having a curvature corresponding to the curvature of the ball.

The linear sliding ball bearing of the present invention is sufficient if it is of the linear sliding type which is provided with an endless track for the balls, and may be a linear ball bearing guiding only the axial motion or a linear sliding ball bearing or ball spline of the type which is capable of bearing a load in the vertical or horizontal direction.

DETAILED DESCRIPTION OF PREFERRED EMBODIMENTS

Figure 1:
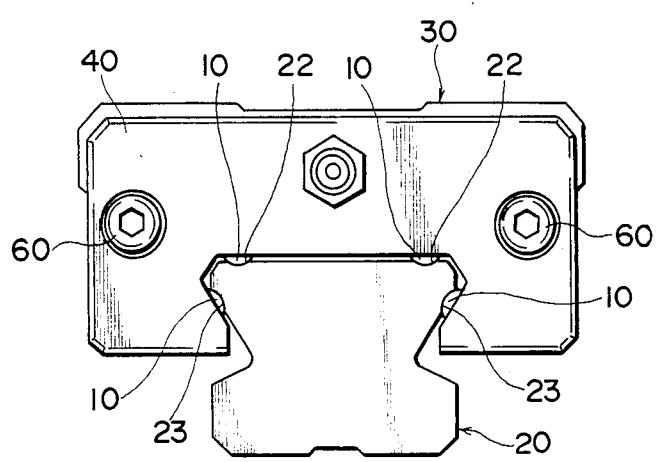
FIG. 1 is a front elevational view of a linear sliding ball bearing of the present invention.

Referring now to the accompanying drawings, detailed description of the preferred embodiments of the present invention will be made hereinunder.

FIGS. 1 to 6 show one example of a ball bearing according to the present invention. The essential portions of the ball bearing of this invention comprise: a track base 20 which is a guide shaft having ball rolling grooves 22, 23 for balls 10 in the axial direction; a bearing body 30 having unloaded ball holes 34 and loaded ball grooves 32, the latter respectively constituting an endless track for the balls 10 rolling along the rolling grooves 22, 23, and the bearing body 30 being adapted to effect linear reciprocal movement along the track base 20 via the balls 10; and a pair of side covers 40 each having a pair of guide grooves 42 for guiding the balls 10 between the respective loaded ball grooves 32 and the respective unloaded ball holes 34.

Figure 7:
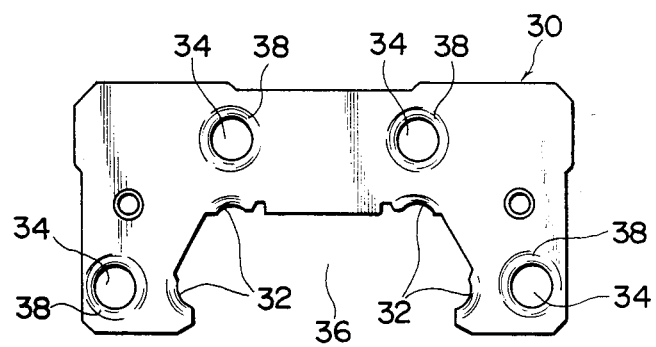
FIG. 7 is a front elevational view of a bearing body according to the present invention.
Figure 8:
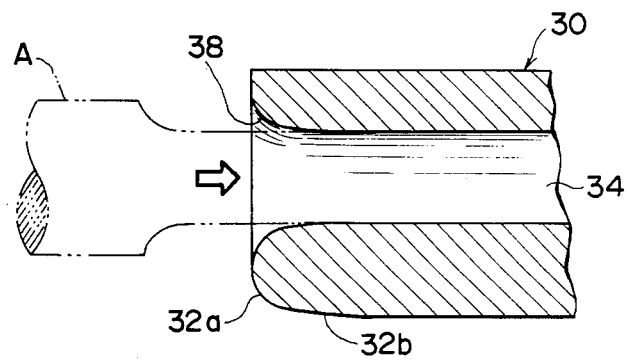
FIG. 8 is a cross-sectional view illustrating a chamfered recess formed in the unloaded ball hole of the bearing body according to the present invention.
Figures 9, 10:
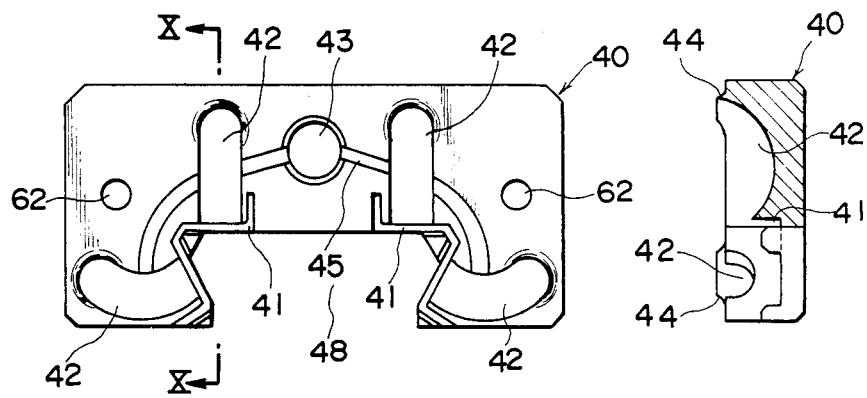
FIG. 9 is a front elevational view of a side cover according to the present invention.
FIG. 10 is a cross-sectional view taken along the line X—X of FIG. 9.
Figure 11:
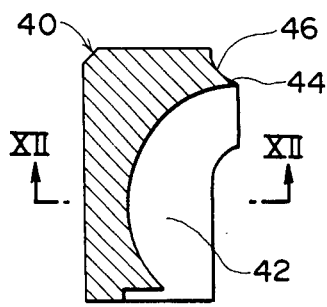
FIG. 11 is an enlarged cross-sectional view of an end portion of the side cover.
Figure 12:
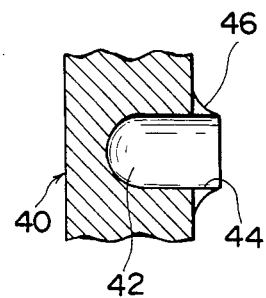
FIG. 12 is a cross-sectional view taken along the line XII—XII of FIG. 11.
Figure 13:
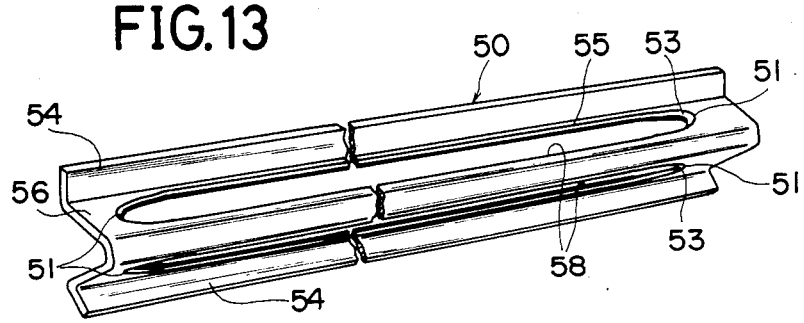
FIG. 13 is a perspective view of a ball retainer according to the present invention.
Figure 14:
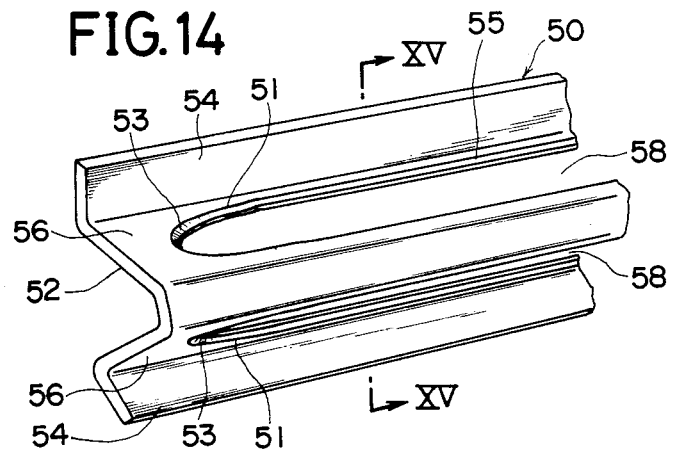
FIG. 14 is an enlarged perspective view illustrating a portion of FIG. 13.
Figure 15:
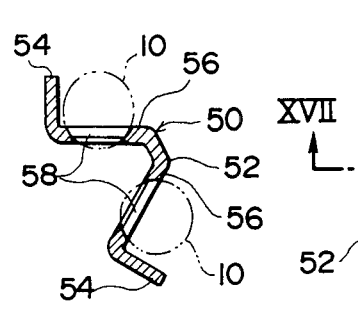
FIG. 15 is a cross-sectional view taken along the line XV—XV of FIG. 14.
Figure 16:
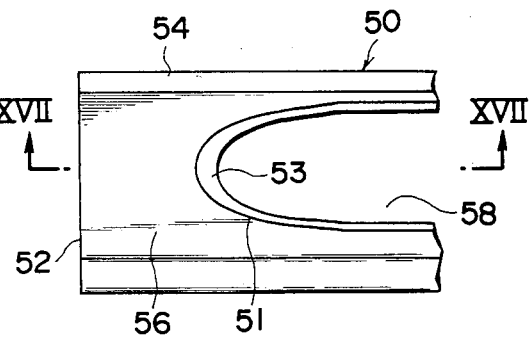
FIG. 16 is a top plan view of essential portions shown in FIG. 14.

The aforementioned bearing body 30 is formed substantially in a U-shape with a U-shaped groove provided on the underside thereof, as shown in FIG. 7, and is adapted such as to be slidably fitted on the top portion of the track base 20. Furthermore, four rows of the loaded ball grooves 32 with the cross section of a circular arc are formed on the right and left inner surfaces of the U-shaped groove 36 such as to respectively oppose the loaded ball rolling grooves 22, 23, which constitute the rolling grooves for the balls 10 that are formed on the both sides of the upper portion of the track 20. In addition, the unloaded ball holes 34 are provided on the rear side of each of the loaded ball grooves 32 in the direction of the track base. In this case, chamfered U-shaped portions 38 having practically the same curvature are formed on the both ends of the loaded ball grooves 32 and the unloaded ball holes 34 by simultaneous working by the use of a drill A, as shown in FIG. 8. A peripheral protrusion 44 for positioning the side cover which is formed around the periphery of the guide groove 42 of the side cover is fitted into this chamfered U-shaped portion 38 (refer to FIG. 5). Incidentally, in this case, the curvature of the an inner-side guide portion 32a for shifting the direction of the balls in the loaded ball groove 32 is set to be identical as that of the chamfered U-shaped portion 38 of the unloaded ball hole 34. In addition, the curved surface of the inner-side guide portion 32a in the moving direction of the balls 10 and curved surface of the chamfered U-shaped portion 38 in the moving direction of the balls 10 are formed on the same concentrical circumference so as to permit the balls 10 to circulate even more smoothly The above-described covers 40 are formed of a synthetic resin and the like, and are secured to the front and rear end surfaces of the bearing body 30 by means of bolts 60. This side cover 40 is formed in the substantially the same configuration as the cross-sectional configuration of the bearing body 30, as shown in FIGS. 9 and 10. The four guide grooves 42 which extend substantially radially and respectively connect the loaded ball grooves 32 to the unloaded ball holes 34 are formed on its inner surface on the side of the bearing body 30. At the same time, the peripheral protrusion 44 for the positioning of the side cover is formed at a position corresponding to the chamfered U-shaped portion 38 at the periphery of the both ends of this guide groove 42 (refer to FIGS. 11 and 12). Incidentally, in this case, a circular arc-shaped chamfered portion 46 which agrees with the chamfered U-shaped portion 38 of the bearing body 30 is formed around the outer periphery of the peripheral protrusion 44. Accordingly, it is possible to effect positioning accurately even if there is some error in the dimensional accuracy of the unloaded ball hole 34 in the bearing body 30 relative to the guide groove 42 of of the side cover 40. In addition, a retaining groove 41 for retaining a ball retainer 50 is formed on the inner side of the U-shaped portion 48 of this side cover 40. Incidentally, reference numeral 43 denotes a greese nipple installing hole bored in the axial direction in each of the side covers 40; 45, an oil groove for connecting an oil port 43 and the guide groove 42; and 62, an insertion hole for the bolt 60.

Furthermore, a multiplicity of the balls 10 are disposed in the endless track of the balls 10 which is formed by the rolling grooves 22, 23 in the track base 20 opposing the loaded ball groove 32 and the unloaded ball hole 34 of the bearing body 30 thus constructed. Each of the balls 10 is held by the ball retainer 50 interposed between the loaded ball groove 32 of the bearing body 30 and the rolling grooves 22, 23 of the track base 20, thereby preventing the balls from coming off when the bearing body 30 is separated from the track base 20.

Figure 2:
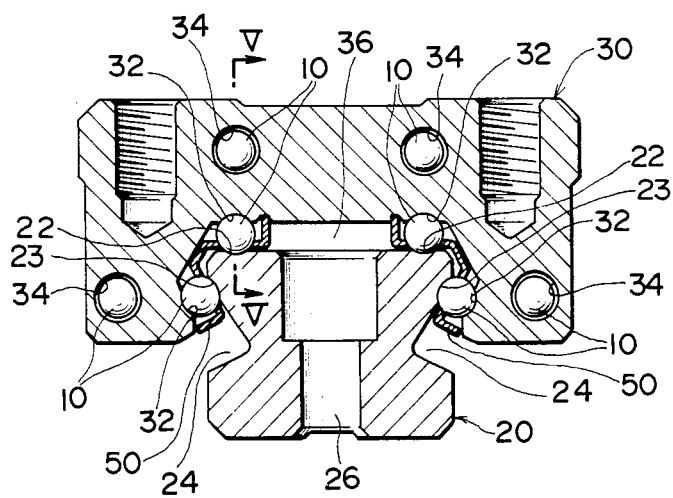
FIG. 2 is a front vertical cross-sectional view thereof.
Figure 3:
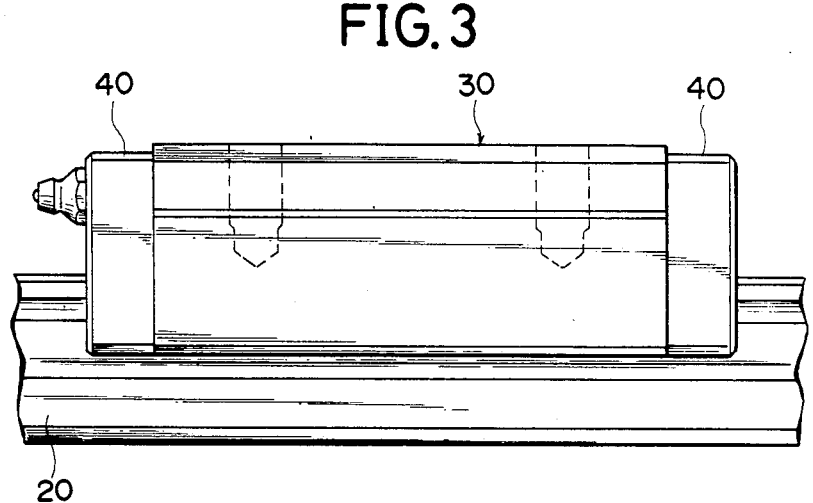
FIGS. 3 and 4 are a side elevational view and a top plan view of FIG. 1, respectively.
Figure 4:
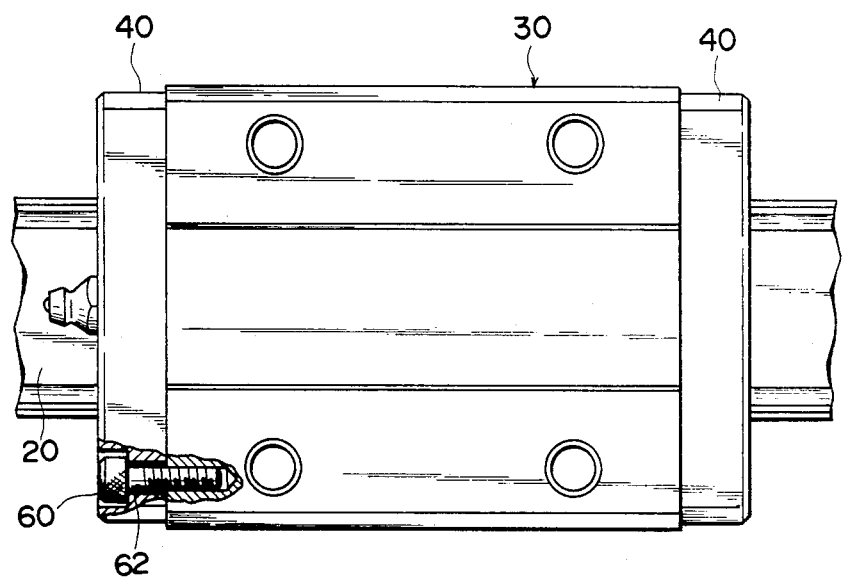
Figure 5:
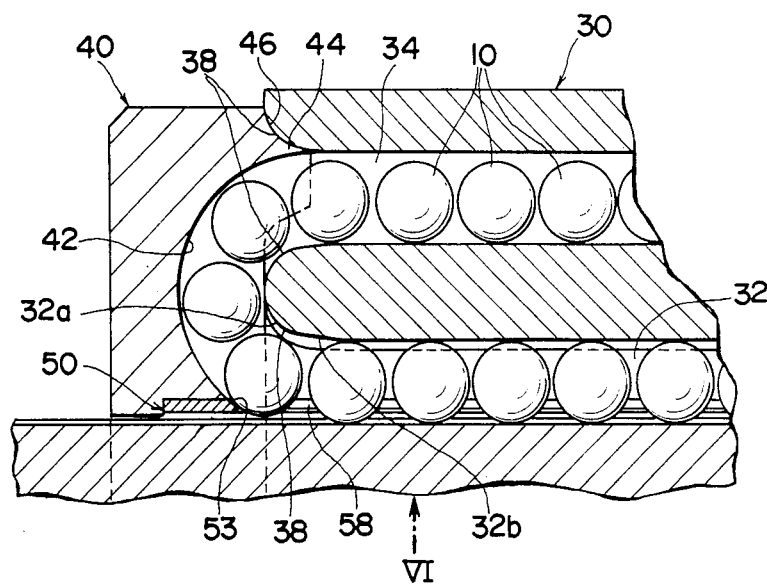
FIG. 5 is a cross-sectional view taken along the line V—V of FIG. 2.
Figure 6:
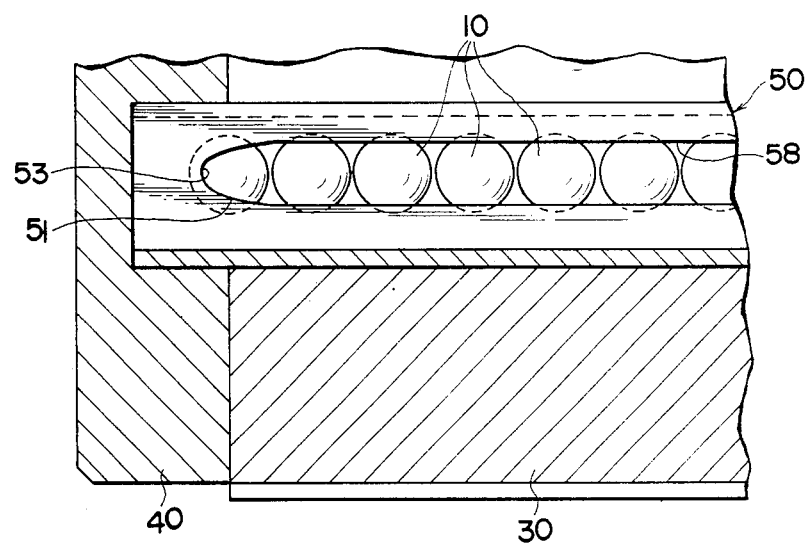
FIG. 6 is a view taken in the direction of a arrow VI in FIG. 5.

This ball retainer 50 is incorporated in the bearing body 30, as shown in FIGS. 2, 5, and 6, and is adapted to prevent coming off of the balls 10 bearing a load between the bearing body 30 and the track base 20 for guiding the linear reciprocation of the bearing body 30 and, at the same time, forms an endless track of the balls 10.

Figure 17:
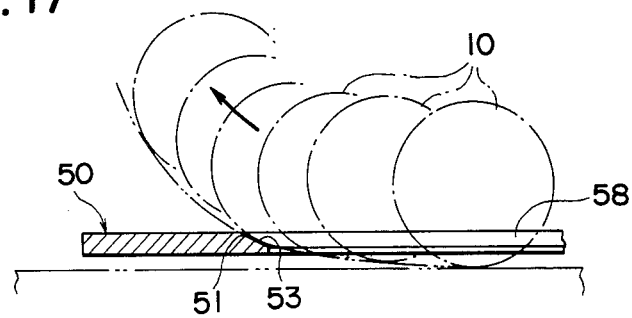
FIG. 17 is a cross-sectional view taken along the line XVII—XVII of FIG. 16.

The entire ball retainer 50 is formed of a metal plate and, as shown in FIGS. 2 to 17, has a retainer base 52 whose side configuration is substantially rectangular and whose cross section is bent in a substantially trapezoidal shape and two flanges 54 extending at a fixed angle from the both sides of the retainer base 52 (the drawings show a case where it is orthogonal). At the same time, an elongated hole 58 is provided which forms the loaded region of the endless track in such a manner as to oppose the loaded ball groove 32 formed in the bearing body 30 and which allows a portion of theball 10 to project toward the side of the track base. In this case, a ball feeding portion 51 is formed in the unloaded region of the endless track formed from the loaded region to the unloaded region of the endless track formed on the bearing body side, or from this unloaded region to the loaded region, is formed at both ends in the longitudinal direction of this elongated hole 58 in such a manner that the witdth thereof become gradually smaller. At the same time, a ball-abutting surface 53, which is constituted by a slanting portion opposing the coninuous slanting surface in the guide groove 42 of the side cover 40, is formed at the edge of the opening of the ball feeding portion 51. Between the ball feeding portions 51 of this elongaged hole 58 are formed tapered surfaces which are provided at the edge portions of the opening and are parallel with each other, thereby forming a continuous taper along the entire periphery of the opening of the elongaged hole 58. An escaping slanting portion 32b for the movement of the balls 10 is formed at the both ends of the loaded ball groove 32 which oppose the ball-abutting surfaces 53. As shown in FIG. 17, when the balls 10 move along this elongaged hole 58, the ball-feeding portion 51 is capable of gradually lifting the balls 10 and gradually lifting the balls 10 so as to smoothly feed the balls into the guide groove 42 via the ball-abutting surface 53. Thus, the circulation of the balls 10 from the loaded region side of the endless track to the unloaded region side thereof can be effected smoothly, and, at the same time, it becomes possible to reduce the width of the opening of the elongated hole 58, thereby making it possible to prevent the coming off of the balls 10 more positively.

It should be noted that, in this case, the ball-feeding portion 51 is sufficient if its width becomes gradually smaller toward the end, and if it is capable of feeding the balls 10 from the loaded region side of the endless track to the unloaded region side thereof when the balls 10 move along this elongaged hole 58, and its configuration may be a semielliptical or V-shaped. In addition, with respect to the ball-abutting surface 53 as well, it suffices if it is capable of receiving the balls 10 with each of its slanting surfaces, and the ball-abutting surface 53 may be a slanting planar surface or a slanting surface having a curvature corresponding to that of the ball 10. Furthermore, it suffices if the ball-abutting surface 53 is formed at least in the ball-feeding portion 51 of the elongated hole 58. Incidentally, in this case, the movement of the balls 10 becomes even smoother if the curvature of the ball-abutting surface 53 of the ball-feeding portion 51 is set such as to be identical with that of the guide groove 42 of the side cover 40 (refer to FIG. 5).

Figure 18:
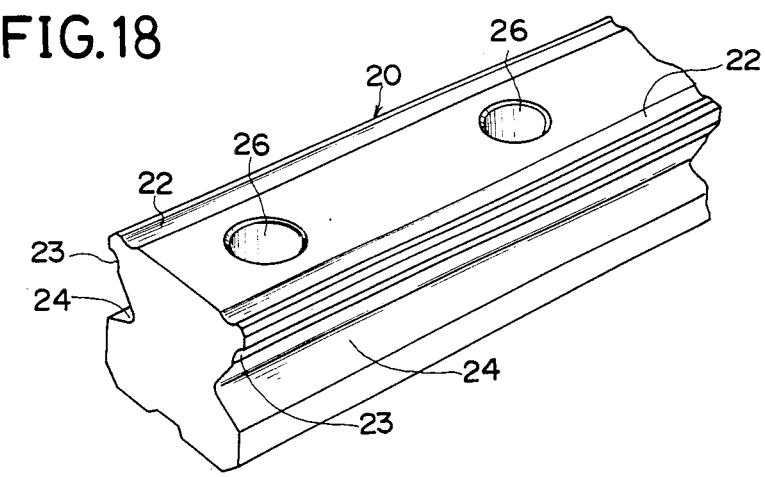
FIG. 18 is a perspective view of a track base according to the present invention.

Meanwhile, as shown in FIG. 18, the track base 20 is formed such that a V-shaped groove 24 is formed on both sides of the rectangular portion thereof, and the ball-rolling groove 22 and the lower loaded ball-rolling groove 23 are formed on the upper and lower surfaces of the both shoulders of the upper portion thereof, respectively. Additionally, set bolt holes 26 for installation on a bed (not shown) are provided at appropriate intervals.

In the linear sliding ball bearing of the present invention having the above-described construction, while balls 10 are gradually lifted by the ball-feeding portion 51 formed at both ends of the elongated hole 58 in the longitudinal direction thereof, which is provided in the ball retainer 50, the balls 10 are fed from the loaded region of the endless track to the guide groove 42 of one of the side covers 40. Then, the balls 10 are fed into the unloaded ball hole 34 of the bearing body 30 via the guide groove 42, and are again circulated from this unloaded ball hole 34 to the loaded region of the endless track via the guide groove 42 of the opposite side cover 40. At this juncture, since the balls 10 are supported by the ball-abutting surface 53 provided in the ball retainer 50, it becomes possible to effect a smooth movement of the balls between the loaded region and the guide groove. The chamfered U-shaped portions 38, as indicated in FIG. 8 are produced by a single tool A, and the inner-side guide portions 32a are produced by the same tool A to procide for the same curvature of surfaces of each. In addition, since the edge portion of the opening of the unloaded ball hole 34 of the bearing body 30 and the guide groove 42 are fitted to a high accuracy, the balls 10 can move smoothly inside the endless track.

What is claimed is:

1. A linear sliding ball bearing, comprising:
   a guide shaft having a ball-rolling groove along an axial direction thereof;
   a bearing body having a loaded ball groove and an unloaded ball hole extending in the axial direction and which form an endless track for balls rolling along said rolling groove to enable linear reciprocating motion of said bearing body along said guide shaft via the rolling balls;
   a pair of side covers, one each disposed at an end surface at each end of said bearing body and each cover having a guide groove for guiding the balls between said loaded ball groove and said unloaded ball hole;
   a ball retainer forming a portion of said endless track on said bearing body for preventing the balls from falling off when said bearing body is separated for said guide shaft, said ball retainer positioned opposite said loaded ball groove for maintaining said balls therebetween, having an elongated hole extending axially therealong such that a portion of each ball between said retainer and said loaded ball groove projects through said elongated hole toward an associated ball-rolling groove on said guide shaft, said ball retainer including a ball-feeding portion formed at each end portion of said elongated hole in the longitudinal direction thereof for feeding the balls from said loaded ball groove to said unloaded ball hole of said endless track and vice-versa, wherein the width of said elongated hole becomes gradually smaller near the ball-feeding portions of each end thereof, and
   wherein said ball retainer further has a slanting surface on the edge of said elongated hole on a ball-abutting surface thereof, such that said slanting surface forms a continous surface with the guide groove of said side cover, said slanting surface formed at least on said ball-feeding portion of said ball retainer, and further wherein the width of said slanting surface is greatest at each end portion of said elongated hole, and gradually decreases as the width of the elongated hole increases; and
   a chamfered U-shaped portion being formed around said unloaded ball hole at both ends thereof, said chamfered U-shaped portion having the same curvature as that of an inner surface-side guide portion of said loaded ball groove, at both ends thereof, and wherein each of said side covers has a peripheral protrusion extending from a peripheral edge of the guide groove, said protrusion being in cooperative engagement with said chamfered U-shaped portion of said unloaded ball hole.

2. The linear sliding ball bearing of claim 1, wherein said slanting surface is formed along the entire length of said elongated hole.

* * * * *